US012662071B2

(12) United States Patent
Behrens et al.

(10) Patent No.: US 12,662,071 B2
(45) Date of Patent: Jun. 23, 2026

(54) ATTACHMENT PART FOR A MOTOR VEHICLE, MOTOR VEHICLE COMPRISING AN ATTACHMENT PART OF THIS TYPE, AND PRODUCTION METHOD

(71) Applicant: Bayerische Motoren Werke Aktiengesellschaft, Munich (DE)

(72) Inventors: Nicolas Behrens, Marzling (DE); Markus Dix, Landshut (DE); Patrick Dumm, Offenstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 806 days.

(21) Appl. No.: 17/927,265

(22) PCT Filed: Apr. 26, 2021

(86) PCT No.: PCT/EP2021/060807

§ 371 (c)(1),
(2) Date: Nov. 22, 2022

(87) PCT Pub. No.: WO2021/239359

PCT Pub. Date: Dec. 2, 2021

(65) Prior Publication Data

US 2023/0202409 A1     Jun. 29, 2023

(30) Foreign Application Priority Data

May 27, 2020     (DE) ..................... 10 2020 114 135.1

(51) Int. Cl.
B60R 16/03          (2006.01)
F24D 13/02          (2006.01)
H05B 3/26           (2006.01)
(52) U.S. Cl.
CPC .............. B60R 16/03 (2013.01); H05B 3/26 (2013.01); F24D 13/02 (2013.01);
(Continued)

(58) Field of Classification Search
CPC .... B60R 16/03; H05B 3/26; H05B 2203/013; H05B 2203/016; F24D 13/02; Y02B 30/00
See application file for complete search history.

(56) References Cited

U.S. PATENT DOCUMENTS 3,813,519 A * 5/1974 Jochim .................. H01C 17/16
                                                  338/217
4,250,399 A * 2/1981 King ........................ H05B 3/32
                                                  219/532
(Continued)

FOREIGN PATENT DOCUMENTS

DE          36 04 437 A1     8/1987
DE          38 74 829 T2     4/1993
(Continued)

OTHER PUBLICATIONS

DE102008005908A1 translation via espacenet.com (Year: 2025).*
(Continued)

*Primary Examiner* — Elizabeth M Kerr
*Assistant Examiner* — Keith Brian Assante
(74) *Attorney, Agent, or Firm* — Crowell & Moring LLP

(57)          ABSTRACT

An attachment part for a motor vehicle includes a main body and a securing element where the attachment part is mechanically securable to the motor vehicle by the securing element. An electrical consumer is integrated into the attachment part. Connection conductor tracks are attached to the main body, contact the electrical consumer, and extend as far as the securing element where the electrical consumer is electrically connectable to a power supply on the motor vehicle by the connection conductor tracks.

11 Claims, 2 Drawing Sheets

(52) U.S. Cl.
CPC .. *H05B 2203/013* (2013.01); *H05B 2203/016*
(2013.01); *Y02B 30/00* (2013.01)

(56) References Cited

U.S. PATENT DOCUMENTS

| 4,878,850 | A | | 11/1989 | Letemps et al. |
|---|---|---|---|---|
| 5,023,752 | A | * | 6/1991 | Detter ................. B60R 16/0238 |
| | | | | 361/752 |
| 5,629,712 | A | | 5/1997 | Adrian et al. |
| 6,184,496 | B1 | * | 2/2001 | Pearce ................. E01C 11/265 |
| | | | | 219/202 |
| 6,727,477 | B1 | * | 4/2004 | Li-Chen .................... G01K 1/14 |
| | | | | 439/38 |
| 6,834,969 | B2 | | 12/2004 | Bade et al. |
| 2003/0047555 | A1 | * | 3/2003 | Keum ...................... H05B 3/28 |
| | | | | 219/444.1 |
| 2007/0295706 | A1 | * | 12/2007 | Brun .................... B60H 1/2225 |
| | | | | 219/202 |
| 2012/0153688 | A1 | | 6/2012 | Gerken et al. |
| 2016/0221505 | A1 | | 8/2016 | Kendall |
| 2016/0270153 | A1 | * | 9/2016 | Duce ........................ H05B 3/20 |
| 2018/0294590 | A1 | | 10/2018 | Colombel et al. |
| 2019/0123457 | A1 | * | 4/2019 | Bulgajewski ........ H05K 1/0209 |
| 2020/0025052 | A1 | * | 1/2020 | Gross ........................ H05B 3/06 |
| 2022/0163751 | A1 | * | 5/2022 | Park ........................ G03B 30/00 |

FOREIGN PATENT DOCUMENTS

| DE | 603 08 022 | T2 | 4/2007 | |
|---|---|---|---|---|
| DE | 102008005908 | A1 | * | 7/2009 ........... H01Q 1/1221 |
| DE | 20 2015 105 218 | U1 | 2/2017 | |
| EP | 1 273 809 | B1 | 4/2006 | |

OTHER PUBLICATIONS

German-language European Office Action issued in European Application No. 21 722 172.0 dated Dec. 20, 2024 (4 pages).
PCT/EP2021/060807, International Search Report dated Jul. 16, 2021 (Two (2) pages).
German-language German Office Action issued in German application No. 10 2020 114 135.1 dated Mar. 5, 2022 (Five (5) pages).
German Search Report issued in German application No. 10 2020 114 135.1 dated Apr. 23, 2021, with Statement of Relevancy (Six (6) pages).

* cited by examiner

ATTACHMENT PART FOR A MOTOR VEHICLE, MOTOR VEHICLE COMPRISING AN ATTACHMENT PART OF THIS TYPE, AND PRODUCTION METHOD

BACKGROUND AND SUMMARY OF THE INVENTION

The invention relates to an attachment part for a motor vehicle, a motor vehicle comprising an attachment part of this type, and a production method.

It is known to install in vehicles attachment parts into which an electrical consumer is integrated. This can be, for example, a light or a surface heating system. Until now, the production of such an attachment part has required many individual components that have to be joined and connected together. Using the example of a surface heating system, for example, a heating foil or a heating textile has so far been bonded to a carrier component, such as a decorative panel. The heating foil is electrically contacted by means of a cable tail with connector. This in turn must be connected to the wiring harness of the vehicle.

Such a set-up is expensive due to the many individual components required and requires a lot of installation space. In particular, accessibility for contacting is not provided in certain installation spaces, and therefore electrical function cannot be ensured there.

Against this background, it is the object of the invention to specify an improved way of integrating electrical consumers into a vehicle. In particular, simple assembly and reliable electrical contacting are to be ensured.

An attachment part for a motor vehicle is specified comprising a main body and at least one securing element for mechanically securing the attachment part to the vehicle. Furthermore, an electrical consumer is integrated into the attachment part.

To improve the assembly of the attachment part and to establish reliable electrical contacting of the electrical consumer, connection conductor tracks for electrical connection of the consumer to a power supply on the vehicle are attached to the main body and contact the electrical consumer and extend as far as the securing element.

Furthermore, a motor vehicle is specified comprising an attachment part according to the invention. The attachment part is secured to the vehicle by means of the securing element by engagement with a mating securing element arranged on the vehicle. The mating securing element is further configured as an electrical mating contact for the connection conductor tracks, so that the electrical consumer is connected to an electrical or electronic device on the vehicle by the engagement of the securing element and the mating securing element.

Furthermore, a method for producing an attachment part for a motor vehicle is described. The method includes the following steps:

proviing a main body and a securing element arranged on the main body, attaching an electrical consumer to or in the main body, and applying conductor tracks to the main body that contact the electrical consumer and extend as far as the securing element.

By routing the connection conductor tracks as far as the securing element, this also has a function as an electrical contact for contacting the electrical consumer in addition to the mechanical securing function. The corresponding mating securing element on the vehicle is likewise embodied as an electrical contact and is connected by means of lines to an electrical or electronic device on the vehicle, for example connected to the vehicle battery. If the attachment part is now secured to the vehicle, for which purpose the securing element and mating securing element engage with each other, the electrical contact is performed at the same time as the mechanical fixing. This embodiment eliminates the need for connection of a separate cable connector. This reduces the installation space required and the parts costs, and also reduces the assembly effort.

By using conductor tracks to create connection options for the electrical consumer on the attachment part, virtually no additional installation space is required, as the conductor tracks can be designed to be very flat. In addition, the conductors are fixed to the attachment part and cannot slip during assembly, which reduces the risk of damage.

The main body has a visible side and an inner side. The visible side is the side that is visible in the installed state, whereas the inner side usually faces the vehicle body. The main body preferably defines the outer dimensions, in particular the contour of the attachment part. The main body can comprise a plastics body, a metal body, a glass body or a composite body. The main body can in particular have further layers, such as decorative layers, paint layers, or the like.

The electrical consumer is integrated into the attachment part; for this purpose the electrical consumer is arranged in a stationary manner in or on the main body, for example fixed thereto mechanically and/or in an integrally bonded manner. The connection conductor tracks contact the consumer and thus provide a connection option for connecting the electrical consumer to an electrical or electronic device, such as a power source or a control unit.

The electrical consumer can, for example, be a light source, such as an LED (light-emitting diode). Particularly preferably, the electrical consumer is a surface heating system for heating or controlling the temperature of the attachment part. This system can be arranged and fixed to the main body as a heating foil or heating textile.

In a preferred embodiment, the panel heating system comprises a conductor track structure attached to the main body. The conductor track structure is configured to heat up when electrical power is passed through it. The conductor track structure can comprise one or more interconnected conductor tracks. The conductor track structure allows almost unlimited freedom in the embodiment of the resistor element and thus offers a wide range of possibilities for selectively adjusting the energy input into the heating zone. By appropriate selection of the dimensions of the conductor tracks, the materials used and the design of the conductor track pattern, heating elements can be realized for a wide variety of requirements. Complex geometries can also be realized on three-dimensional surfaces. Since not only the connection conductor tracks but also the surface heating system are formed by conductor tracks, the installation height can be kept very low. Production is particularly simple because the connection leads and the electrical consumer can be produced in a joint production step by forming the conductor tracks. This also ensures reliable electrical contact between the connection conductor tracks and the electrical consumer in a simple manner.

The at least one securing element serves to mechanically secure the attachment part to the vehicle. Preferably, the attachment part can have two or more securing elements. The securing element(s) is/are connected to the main body, for example welded, bonded, screwed or preferably integrally molded in one piece to the main body, for example in an injection molding process. In a preferred embodiment, the securing element can be a clip or latching element or a clamping element. The securing element interacts with a corresponding mating securing element on the vehicle. The mating securing element can be part of a vehicle component or an independent component. The use of clip, latching or clamping elements enables particularly simple assembly by bringing the securing element and the mating securing element together, wherein at the same time an electrical contact is generated between the connection conductor tracks on the securing element and corresponding contact structures on the mating securing element.

In a preferred embodiment, the securing element is formed as an element protruding from the inner side and the connection conductor tracks are arranged on opposite side faces of the securing element. This results in better tolerances for the connection by means of the mating securing element and a uniform distribution of forces for the contacting of the connection conductor tracks. The risk of short circuits can be reduced and leakage currents can be kept low.

In an advantageous embodiment, a capacitive sensor array with a further conductor track structure can also be arranged on the main body. The sensor array can, for example, be configured to generate signals by means of which the electrical consumer is switched on or off or various heating stages or heating functions are activated. In this way, an operating element for controlling the electrical consumer can be integrated into the attachment part without requiring additional installation space. In addition to the function-providing conductor track structure, the sensor array also has sensor connection conductor tracks which extend from the function-providing conductor track structure to the securing element. In this embodiment, the securing element additionally functions as an electrical contact for the sensor array, for example in order to forward the sensor signals to a control unit on the vehicle. In this embodiment, the mating securing element on the vehicle has corresponding contact structures that establish an electrical connection to the sensor connection conductor tracks in the assembled state. The sensor signals are then forwarded from the contact structures on the mating securing element, for example via lines, to a control device for the electrical consumer.

The securing element can have further printed conductor tracks in order to realize several or additional signal or supply lines. These can be printed on one side of the securing element or distributed over two or more sides. The mating securing element is then embodied with corresponding contact structures for contacting the further conductor tracks.

The conductor tracks, which form, for example, the connection conductor tracks, the conductor track structure(s) and/or the sensor connection conductor tracks, can be formed on the main body using conventional processes such as hot stamping or laser (direct) structuring.

In a preferred embodiment, these conductor tracks are formed by means of printing processes such as screen printing, flexographic printing, pad printing, inkjet printing and the like, and are printed onto the main body. This enables particularly economical production, since no waste products are produced and no expensive semi-finished products have to be purchased. Electrically conductive inks, such as polymer thick-film inks, in particular silver, copper, aluminum, iron and graphite inks, are suitable for production by means of printing processes. If necessary, the conductor tracks can be annealed after the single-stage or multi-stage printing process. By means of such printing techniques, a high degree of accuracy can be achieved with regard to the dimensions and position of the conductor tracks.

Features and details described in conjunction with the attachment part also apply in conjunction with the vehicle and method according to the invention, and vice versa in each case, and therefore reference is or can always be made mutually with regard to the disclosure concerning the individual aspects of the invention.

Further advantages, features and details of the invention will become apparent from the following description, in which exemplary embodiments of the invention are described in detail with reference to the drawings.

The features mentioned in the claims and in the description can each be essential to the invention individually or in any combination. Where the term "can" is used in this application, it refers both to the technical possibility and to the actual technical implementation.

In the following, exemplary embodiments are explained on the basis of the accompanying drawings shown in schematic representation.

DETAILED DESCRIPTION OF THE DRAWINGS

Figure 1:
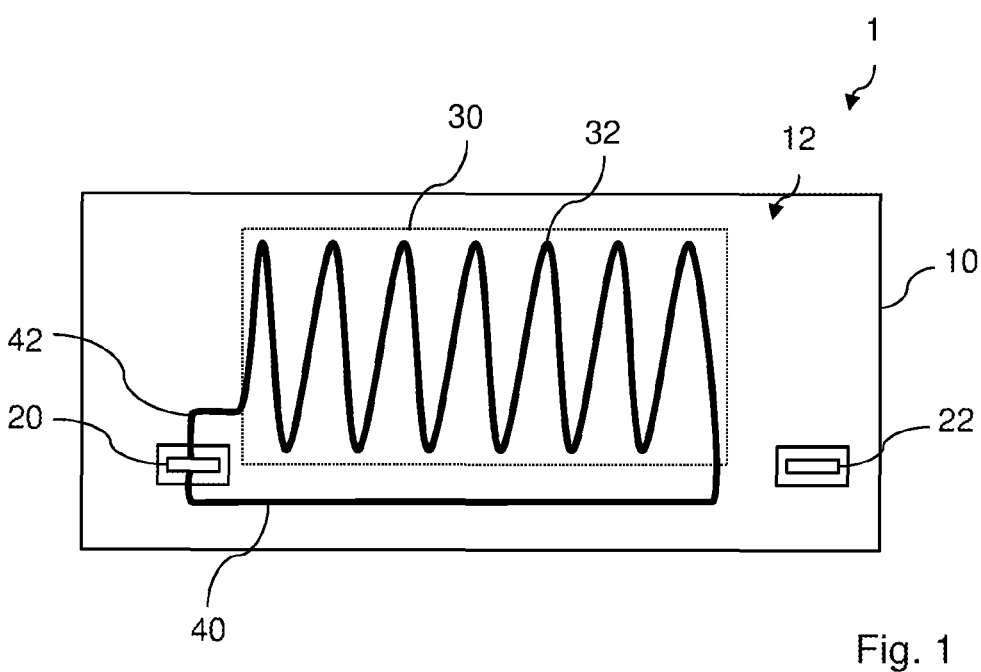
FIG. 1 is a plan view of an exemplary attachment part.

An exemplary attachment part 1 includes a main body 10. FIG. 1 shows a plan view of an inner side 12 of the attachment part 10. A visible side opposite the inner side 12 is directed into the image plane.

Securing elements 20, 22 are arranged on the inner side 12 and serve to mechanically secure the attachment part to the vehicle. Two securing elements 20, 22 are shown as an example; more or fewer securing elements can also be provided.

Furthermore, an electrical consumer 30 in the form of a surface heating system is arranged on the inner side 12 of the attachment part 10. The surface heating system has a conductor track structure 32, which is formed as a heating portion and can be heated by applying an electrical power. The conductor track structure is contacted via connection conductor tracks 40, 42. The connection conductor tracks run over the main body 10 and are continued as far as the securing element 20.

Figure 2:
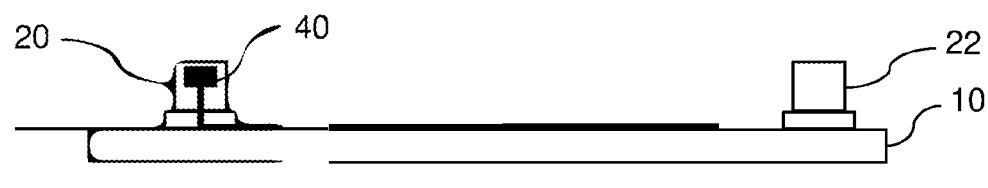
FIG. 2 is a side view of the attachment from FIG. 1.

FIG. 2 shows a side view of the attachment part 1 from FIG. 1. It can be seen that the securing elements 20, 22 each protrude from the inner side of the attachment part 1. The connection conductor tracks 40, 42 are led up on opposite sides of the securing element 20 and extend up into a securing portion of the securing element 20. In the end region, the connection conductor tracks 40, 42 can be widened to enable better contact.

Figure 3:
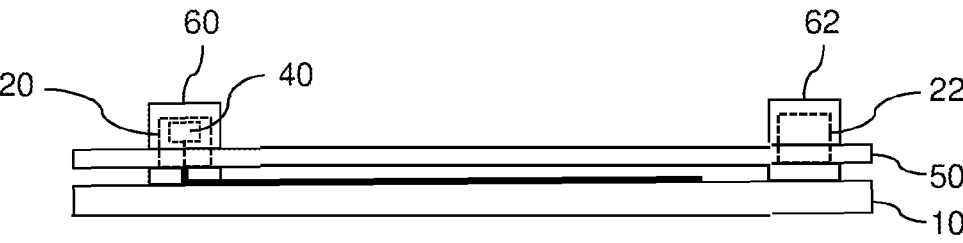
FIG. 3 is a side view of the attachment part from FIG. 1 installed in a vehicle.

To assemble the attachment part 10 on the vehicle, it is secured to a further component 50, which can be part of the vehicle body, for example, see FIG. 3. For this purpose, the securing elements 20, 22 are guided through recesses in the component 50, wherein their securing portions engage with corresponding mating securing elements 60, 62 on the vehicle. In the present case, the securing elements 40, 42 and the mating securing elements 60, 62 are a clamping and latching connection.

5

Figure 4:
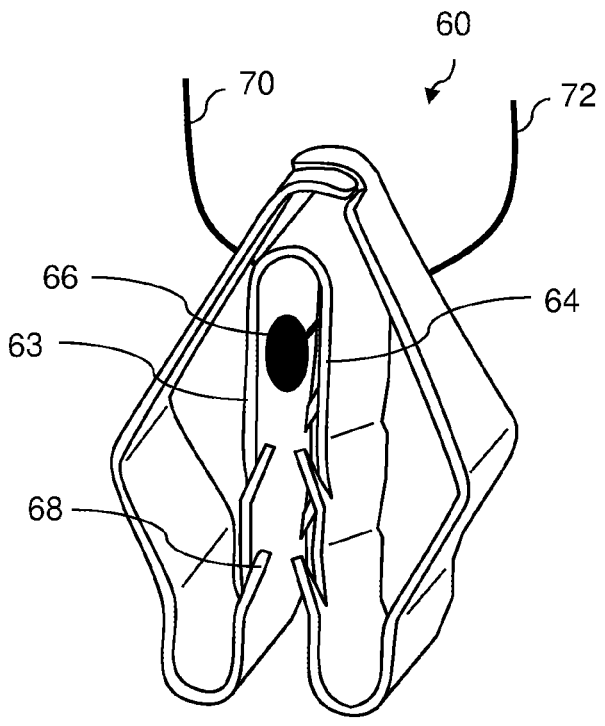
FIG. 4 is an exemplary mating securing element.

An exemplary mating securing element 60 is shown in FIG. 4. When the securing element 20 is pushed into the mating securing element 60, the spring structure of the mating securing element 60 ensures that the inner limbs 63, 64 come into contact with the securing element 20. This achieves a mechanical securing. The mating securing element 60 furthermore has detent lugs 68, which press into the inserted securing element 20 and make disassembly more difficult or prevent it.

The mating securing element 60 is also formed as an electrical contact. For this purpose, it has a contact connection on each of the inner limbs 63, 64 (in FIG. 4, only one contact connection 66 can be seen on the inner limb 61), which provides an electrical connection to a power supply on the vehicle via cables 70, 72. These contact terminals correspond to the connection conductor tracks 40, 42 on the securing element 20, so that electrical contact is provided when the securing element 20 and mating securing element 60 engage with each other. Consequently, the mechanical securing of the attachment part also results in electrical contact with the surface heating system at the same time.

Figure 5:
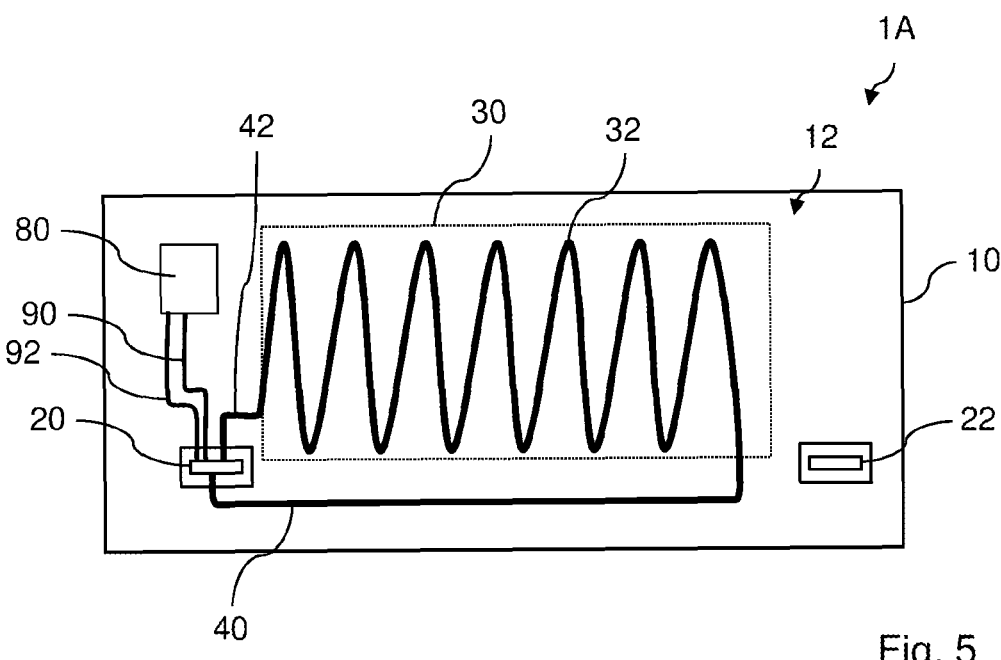

FIG. 5 shows a plan view of a further exemplary attachment part 1A. In addition to the attachment part 1 described in FIG. 1, this attachment part has a capacitive sensor array 80 with a further conductor track structure, not shown in more detail, as well as sensor connection conductor tracks 90, 92, which are routed from the sensor array to the securing element 20 for electrical contacting of the sensor array with a vehicle-side power supply and/or a control unit. The sensor array 80 is configured, for example, to be able to set operating modes of the surface heating system or to be able to switch it on or off.

The sensor array 80 can then be electrically contacted analogously to the described contacting of the surface heating system 30. For this purpose, additional electrical contacts would have to be provided on the mating securing element 60, which correspond to the sensor connection conductor tracks 90, 92 on the securing element 20 and provide, for example, an electrical contact to a control unit or the like.

The conductor tracks 40, 42, the conductive track structure 32 of the surface heating system 30, the conductor track structure of the sensor array 80, and the sensor connection conductor tracks 90, 92 are preferably printed on the main body 10 using printing technology.

LIST OF REFERENCE CHARACTERS 1, 1A attachment part
10 main body
12 inner side
20, 22 securing elements
30 electrical consumer
32 conductor track structure
40, 42 connection conductor tracks
50 component
60, 62 mating securing element
63, 64 inner limb
66 contact connection
68 detent lugs
70, 72 cable
80 sensor array
90, 92 sensor connection conductor tracks

The invention claimed is:
1. An attachment part for a motor vehicle, comprising:
a planar main body;

6 a securing element that protrudes from the planar main body, wherein the attachment part is mechanically securable to the motor vehicle by the securing element;
an electrical consumer integrated into the attachment part; and
a first connection conductor track and a second connection conductor track, wherein the first connection conductor track and the second connection conductor track are formed on the planar main body, are continued on the planar main body as far as the securing element, are respectively led up on opposite side faces of the securing element, and extend up into a securing portion of the securing element, wherein the first connection conductor track and the second connection conductor track contact the electrical consumer, and wherein the electrical consumer is electrically connectable to a power supply on the motor vehicle by the first connection conductor track and the second connection conductor track.

2. The attachment part according to claim 1, wherein the electrical consumer is a surface heating system and has a conductor track structure attached to the main body.

3. The attachment part according to claim 1, wherein the planar main body has a visible side and an inner side opposite the visible side and wherein the securing element protrudes from the inner side.

4. The an attachment part according to claim 1, further comprising:
a capacitive sensor array disposed on the planar main body and having a further conductor track structure; and
sensor connection conductor tracks which extend from the capacitive sensor array as far as the securing element.

5. The attachment part according to claim 4, wherein the electrical consumer is a surface heating system and has a conductor track structure attached to the planar main body and wherein the first connection conductor track, the second connection conductor track, the conductor track structure, the sensor connection conductor tracks, and the further conductor track structure of the capacitive sensor array are printed onto the main body by a printing process.

6. A motor vehicle, comprising:
the attachment part according to claim 1; and
a mating securing element disposed on the motor vehicle;
wherein the attachment part is secured to the motor vehicle by an engagement of the securing element with the mating securing element;
wherein the mating securing element is configured as an electrical mating contact for the first connection conductor track and the second connection conductor track such that the electrical consumer is connected to an electrical or electronic device on the motor vehicle by the engagement of the securing element and the mating securing element.

7. The motor vehicle according to claim 6, wherein the securing element and the mating securing element are clip elements or clamping elements.

8. A method for producing an attachment part for a motor vehicle, comprising the steps of:
providing a planar main body and a securing element that protrudes from disposed on the planar main body;
attaching an electrical consumer to or in the planar main body; and
forming a first connection conductor track and a second connection conductor track on the planar main body, wherein the first connection conductor track and the second conductor track are continued on the planar main body as far as the securing element, are respectively led up on opposite side faces of the securing element, and extend up into a securing portion of the securing element, wherein the first connection conductor track and the second connection conductor track contact the electrical consumer, and wherein the electrical consumer is electrically connectable to a power supply on the motor vehicle by the first connection conductor track and the second connection conductor track.

9. The method according to claim 8, further comprising the step of printing the first connection conductor track and the second connection conductor track onto the planar main body.

10. The method according to claim 8, wherein the electrical consumer has a conductor track structure printed on the planar main body.

11. The method according to claim 8, further comprising the steps of:

arranging a capacitive sensor array on the planar main body; and printing a further conductor track structure and sensor connection conductor tracks on the planar main body, wherein the sensor connection conductor tracks contact the further conductor track structure and extend as far as the securing element.

\* \* \* \* \*